United States Patent
Li

(10) Patent No.: US 12,483,143 B2
(45) Date of Patent: Nov. 25, 2025

(54) ISOLATED SWITCHING CONVERTER AND METHOD FOR SOFT-START ON PRIMARY SIDE AND SECONDARY SIDE

(71) Applicant: Hangzhou MPS Semiconductor Technology, Ltd., Hangzhou (CN)

(72) Inventor: Hui Li, Hangzhou (CN)

(73) Assignee: Hangzhou MPS Semiconductor Technology, Ltd., Hangzhou (CN)

( * ) Notice: Subject to any disclaimer, the term of this patent is extended or adjusted under 35 U.S.C. 154(b) by 230 days.

(21) Appl. No.: 18/467,044

(22) Filed: Sep. 14, 2023

(65) Prior Publication Data
US 2024/0113632 A1    Apr. 4, 2024

(30) Foreign Application Priority Data
Sep. 29, 2022 (CN) .......................... 202211226534.7

(51) Int. Cl.
  *H02M 3/335* (2006.01)
  *H02M 1/36* (2007.01)
(52) U.S. Cl.
  CPC ......... *H02M 3/33523* (2013.01); *H02M 1/36* (2013.01)
(58) Field of Classification Search
  CPC ............. H02M 3/33523; H02M 3/315; H02M 3/3155; H02M 3/335; H02M 3/33507; H02M 3/33515; H02M 3/33546; H02M 3/33553; H02M 3/33569; H02M 3/33571; H02M 3/33573; H02M 3/33576; H02M 1/36; H02M 1/38; H02M 1/4233
  See application file for complete search history.

(56) References Cited

U.S. PATENT DOCUMENTS

| | | |
|---|---|---|
| 2015/0103567 A1 | 4/2015 | Wang et al. |
| 2015/0214826 A1 | 7/2015 | Wahby et al. |
| 2016/0141951 A1* | 5/2016 | Mao ........................ H02M 1/36 363/21.02 |
| 2016/0336862 A1* | 11/2016 | Daly ........................ H02M 1/36 |
| 2017/0040901 A1 | 2/2017 | Tumminaro et al. |
| 2018/0041130 A1* | 2/2018 | Kunz ................ H02M 3/33523 |
| 2018/0131279 A1 | 5/2018 | Sun et al. |
| 2022/0209665 A1 | 6/2022 | Li et al. |
| 2022/0209676 A1 | 6/2022 | Li et al. |
| 2023/0034190 A1 | 2/2023 | Li et al. |
| 2023/0188033 A1 | 6/2023 | Chen et al. |
| 2023/0188046 A1 | 6/2023 | Chen et al. |

* cited by examiner

*Primary Examiner* — Nguyen Tran
(74) *Attorney, Agent, or Firm* — Perkins Coie LLP

(57) ABSTRACT

A controller used in an isolated switching converter having a transformer and a primary switch. The controller has an error amplifying circuit, a control generator, an isolation circuit and a threshold generator. The error amplifying circuit generates a first compensation signal based on the difference between an output feedback signal and a reference voltage. The control generator generates a first and second control signals based on the first compensation signal. The isolation circuit provides a first synchronous signal electrically isolated from the first control signal. The threshold generator generates a current threshold voltage for controlling a maximum current flowing through the primary switch. The current threshold voltage gradually increases during a start-up period, and is generated based on the first synchronous signal after the start-up period.

20 Claims, 10 Drawing Sheets

ISOLATED SWITCHING CONVERTER AND METHOD FOR SOFT-START ON PRIMARY SIDE AND SECONDARY SIDE

CROSS-REFERENCE TO RELATED APPLICATIONS

This application claims the benefit of CN application 202211226534.7, filed on Sep. 29, 2022, and incorporated herein by reference.

TECHNICAL FIELD OF THE INVENTION

The present invention generally relates to electronic circuits, and more particularly but not exclusively, to isolated switching converters and associated control methods with soft-start for both primary side and secondary side.

BACKGROUND OF THE INVENTION

Isolated switching converter usually includes a transformer with a primary winding and a secondary winding for providing an isolation. A primary switch is coupled to the primary winding, to control the energy stored in the primary winding is transferred to the secondary winding. A secondary switch is coupled to the secondary winding to provide a regulated output voltage for a load coupled to an output of a secondary side. In the isolated switching converter with peak current control, when a current flowing through the primary switch is increased to reach a turning-off threshold, the primary switch is turned off, and thus controlling the energy delivered to the load.

Isolated switching converter usually have a start-up stage. At the beginning of start-up stage, since the output voltage on the secondary side has not yet been established, e.g., the output voltage is close to the voltage of the secondary reference ground, and there will be a relatively large gap between the output voltage and a desired output voltage. In this case, the feedback is useless and unstable, and the system transient response is poor. In addition, during the start-up stage, the demand to current is low, and the output voltage of the isolated converter with constant peak current control can rise very fast, even causing the output voltage overshoot. In addition, the power devices have to withstand these stresses during the start-up stage, which further affects the cost and efficiency of the isolated switching converter.

SUMMARY OF THE INVENTION

An embodiment of the present invention discloses a controller used in an isolated switching converter, the switching converter has a primary switch. The controller comprises an error amplifying circuit, a control generator, an isolation circuit, a reset signal generator and a threshold generator.

The error amplifying circuit has a first input terminal, a second input terminal and an output terminal, wherein the first input terminal is configured to receive an output feedback signal indicative of an output signal of the isolated switching converter, the second input terminal is configured to receive a reference voltage, the error amplifying circuit provides a first compensation signal at the output terminal based on the difference between the output feedback signal and the reference voltage. The control generator is configured to respectively generate a first control signal and a second control signal based on the first compensation signal. The isolation circuit has a first channel to transmit the first control signal and a second channel to transmit the second control signal, and further has a first output terminal for providing a first synchronous signal electrically isolated from the first control signal and a second output terminal for providing a second synchronous signal electrically isolated from the second control signal. The reset signal generator is configured to generate a reset signal by comparing a current sense signal indicative of a current flowing through the primary switch with a current threshold voltage generated by the threshold generator. The threshold generator comprises a start-up threshold generator and a normal threshold generator. The start-up threshold generator is configured to provide the current threshold voltage which is gradually increasing during a start-up period. The normal threshold generator is configured to provide the current threshold voltage based on the first synchronous signal after the start-up period.

Another embodiment of the present invention discloses an isolated switching converter. The switching converter comprises a transformer, a primary switch and a controller. The controller comprises an error amplifying circuit, a control generator, an isolation circuit and a threshold generator. The error amplifying circuit has a first input terminal, a second input terminal and an output terminal, wherein the first input terminal is configured to receive an output feedback signal indicative of an output signal of the isolated switching converter, the second input terminal is configured to receive a reference voltage, the error amplifying circuit provides a first compensation signal at the output terminal based on the difference between the output feedback signal and the reference voltage. The control generator is configured to respectively generate a first control signal and a second control signal based on the first compensation signal. The isolation circuit has a first channel to transmit the first control signal and a second channel to transmit the second control signal, and further has a first output terminal for providing a first synchronous signal electrically isolated from the first control signal and a second output terminal for providing a second synchronous signal electrically isolated from the second control signal. The threshold generator is configured to provide a current threshold voltage for control a maximum value of a current flowing through the primary switch. The threshold generator comprises a start-up threshold generator and a normal threshold generator. The start-up threshold generator is configured to provide the current threshold voltage which is gradually increasing during a start-up period. The normal threshold generator is configured to provide the current threshold voltage based on the first synchronous signal after the start-up period.

Yet another embodiment of the present invention discloses a control method used in an isolated switching converter. The switching converter has a primary switch and an isolation circuit. The control method comprises the following steps: a current threshold voltage which is gradually increasing is provided during a start-up period. An output feedback signal indicative of an output signal of the isolated switching converter is provided. Based on the difference between the output feedback signal and a reference voltage, a first compensation signal is provided. Based on the first compensation signal, a first control signal and a second control signal are generated. The first control signal is transmitted to a first channel of the isolation circuit to provide a first synchronous signal electrically isolated from the first control signal. The second control signal is transmitted a second channel of the isolation circuit to provide a second synchronous signal electrically isolated from the second control signal. Detecting if a secondary side is activated, the start-up period ends when the secondary side is activated, the current threshold voltage is provided based on the first synchronous signal after the start-up period. A current sense signal indicative of the current flowing through the primary switch with the current threshold voltage is compared and a reset signal is generated for turning-off the primary switch.

BRIEF DESCRIPTION OF DRAWINGS

The present invention can be further understood with reference to the following detailed description and the appended drawings, wherein like elements are provided with like reference numerals.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter with soft-start. In the following detailed description, for the sake of brevity, only a flyback converter is taken as an example to explain and describe the working principle of the present invention.

Figure 1:
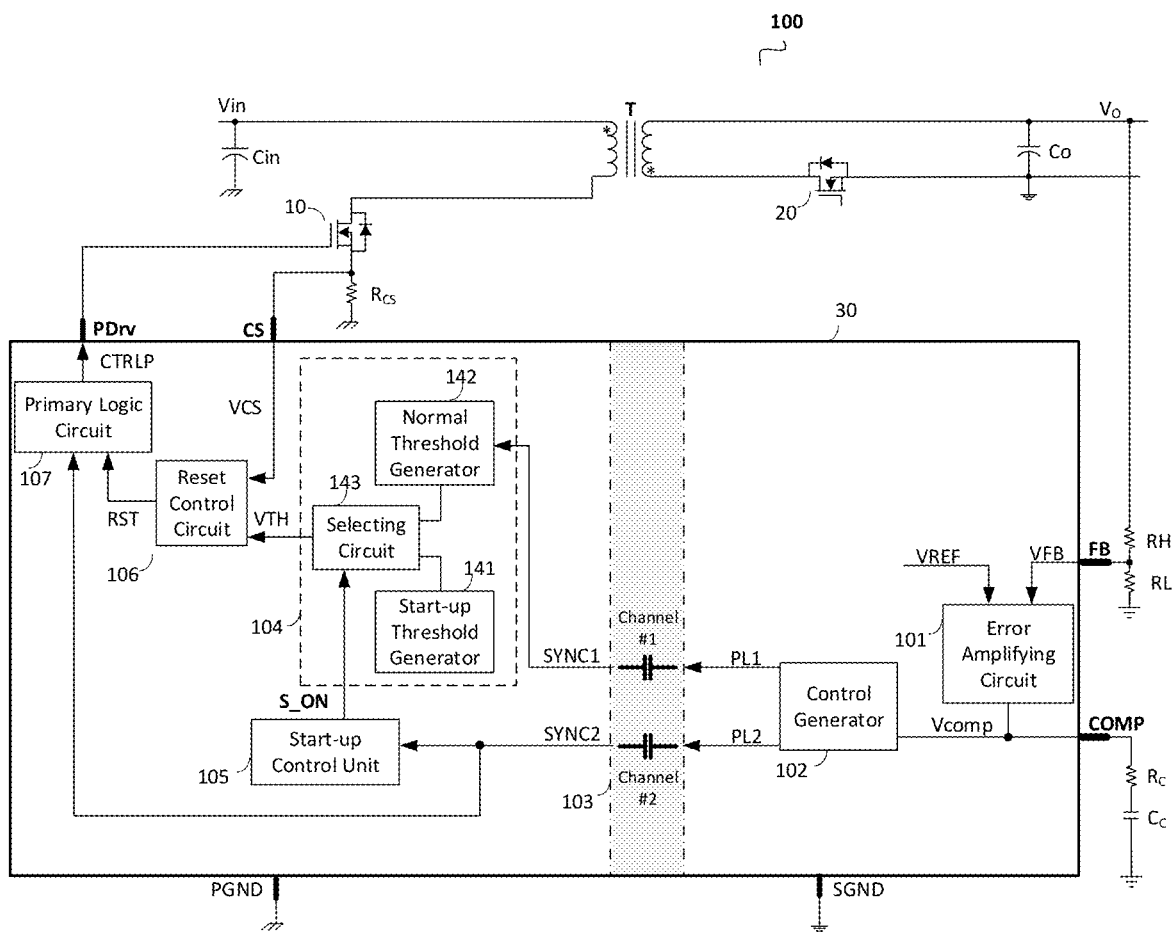
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T providing isolation between a primary side and a secondary side, has a primary winding, a secondary winding and an auxiliary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference ground. The primary switch 10 is coupled between the second terminal of the primary winding and a primary reference ground. The secondary switch 20 is coupled between the second terminal of the secondary winding and a load. However, those skilled in the art should know that the secondary switch 20 may also be coupled between the first terminal of the secondary winding and the load.

In the embodiment shown in FIG. 1, the controller 30 of the switching converter 100 uses quasi-resonant control. The switching converter 100 with quasi-resonant control works under discontinuous current mode, which means once a current flowing through an energy storage component (e.g., the transformer T) reaches zero, the energy storage component begin to resonate with the parasitic capacitance of the primary switch 10, and thus a resonant voltage is generated. The primary switch 10 is turned on when a voltage across the primary switch 10 reaches its resonant valley (valley point of the voltage during resonance) which is called valley switching, so as to reduce the switching loss and EMI.

As shown in FIG. 1, the controller 30 comprises an error amplifying circuit 101, a control generator 102, an isolation circuit 103, a threshold generator 104, a reset signal generator 106 and a primary logic circuit 107. In one embodiment, the controller 30 and the secondary switch 20 are integrated into a monolithic chip and provides a driver circuit for the secondary switch 20.

In the example shown in FIG. 1, the controller 30 comprises a plurality of pins including an output feedback pin FB, a compensation pin COMP, a secondary reference ground pin SGND, a primary reference ground pin PGND, a primary current sense pin CS and a primary control pin PDrv.

As shown in FIG. 1, the error amplifying circuit 101 has a first input terminal, a second input terminal and an output terminal, wherein the first input terminal is coupled to the output feedback pin FB to receive an output feedback signal VFB indicative of an output signal (e.g., the output voltage Vo) of the isolated switching converter 100, the second input terminal is configured to receive a reference voltage VREF, and the output terminal is coupled to the compensation pin COMP. In the example shown in FIG. 1, a resistor divider comprised of resistors RH and RL is coupled between the output voltage Vo and the output feedback pin FB of the controller 30, to sample the output voltage Vo of the switching converter 100 for providing the output feedback signal VFB. The error amplifying circuit 101 is coupled between the output feedback pin FB and the compensation pin COMP, and generates a first compensation signal Vcomp at the output terminal based on the difference between the output feedback signal VFB and the reference voltage VREF.

The control generator 102 is coupled to the compensation pin COMP to receive the first compensation signal Vcomp, and respectively provides a first control signal PL1 and a second control signal PL2 for controlling a current threshold voltage VTH and a switching frequency of the primary switch 10. The isolation circuit 103 has a first channel to transmit the first control signal PL1 and a second channel to transmit the second control signal PL2, and further has a first output terminal for providing a first synchronous signal SYNC1 electrically isolated from the first control signal PL1 and a second output terminal for providing a second synchronous signal SYNC2 electrically isolated from the second control signal PL2. In one embodiment, the isolation circuit 103 may comprise opto-coupler, transformer, capacitor or any other suitable electrical isolation device. In other embodiments, the isolation circuit 103 may be located outside of the controller 30.

As shown in FIG. 1, the reset signal generator 106 has a first input terminal, a second input terminal, and an output terminal, wherein the first input terminal is coupled to the primary current sense pin CS to receive a current sense signal VCS indicative of a current flowing through the primary switch 10. The second input terminal of the reset signal generator 106 is coupled to an output terminal of the threshold generator 104 to receive the current threshold voltage VTH. The reset signal generator 106 compares the current sense signal VCS with the current threshold voltage VTH, and provides the reset signal RST for controlling the turning-off of the primary switch 10. The primary logic circuit 107 provides a primary control signal CTRLP at an output terminal to a control terminal of the primary switch 10 through the primary control pin PDrv, for controlling the primary switch 10.

The threshold generator 104 is configured to provide the current threshold voltage VTH. The threshold generator 104 comprises a start-up threshold generator 141, a normal threshold generator 142 and a selecting circuit 143. During the start-up period of the isolated switching converter 100, the start-up threshold generator 141 is selected to provide the current threshold voltage VTH which is gradually increasing during the start-up period. When the secondary side is activated, the start-up period ends, the normal threshold generator 142 is selected to provide the current threshold voltage VTH. The normal threshold generator 142 is further coupled to the first output terminal of the isolation circuit 103 to receive the first synchronous signal SYNC1, and provides the current threshold voltage VTH based on the first synchronous signal SYNC1 after the start-up period.

In the example shown in FIG. 1, the controller 30 further comprises a start-up control unit 105. The start-up control unit 105 is coupled to the second output terminal of the isolation circuit 103 to receive the second synchronous signal SYNC2. The start-up control unit 105 is configured to detect if the secondary side is activated based on the second synchronous signal SYNC2, and provides an activation signal S_ON at an output terminal. In one embodiment, when a first pulse signal of the synchronous signal SYNC2 is transmitted to the primary side through the second channel of the isolation circuit 103, this means the secondary side is activated.

Figure 2:
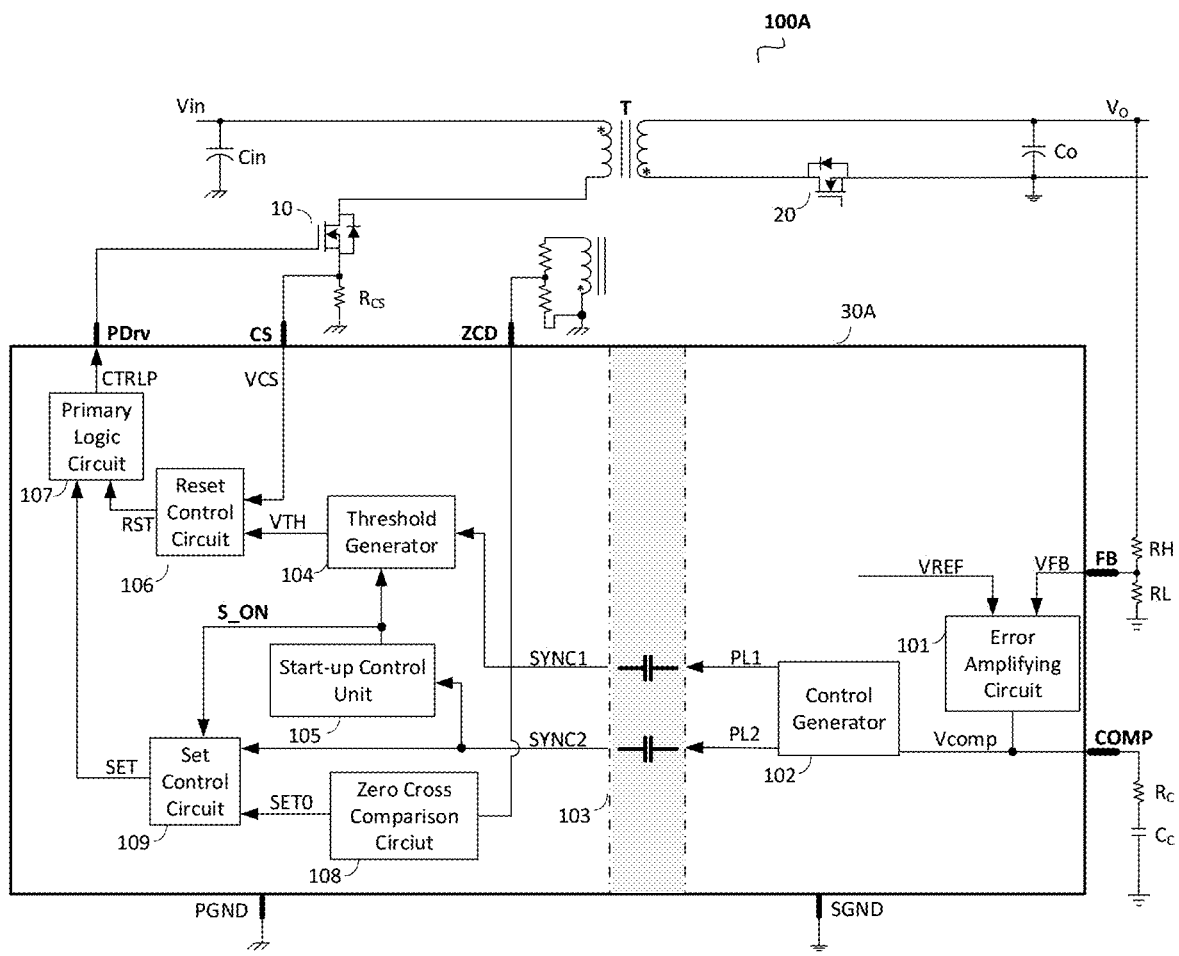
FIG. 2 shows a block diagram of an isolated switching converter 100A in accordance with an embodiment of the present invention.

FIG. 2 shows a schematic diagram of an isolated switching converter 100A in accordance with an embodiment of the present invention. Compared with the switching converter 100 shown in FIG. 1, the switching converter 100A of FIG. 2 further comprises a zero cross comparison circuit 108 and a set signal generator 109.

The zero cross comparison circuit 108 is configured to detect if the voltage $V_{Pri\_DS}$ across the primary switch 10 reached its minimum value, i.e., the valleys. In the example shown in FIG. 2, the isolated switching converter 100A further comprises an auxiliary winding of the transformer T on the primary side. The auxiliary winding is coupled to a zero-crossing detection pin ZCD of the controller 30A through a voltage divider. The zero cross comparison circuit 108 is coupled to the zero-crossing detection pin ZCD to receive a zero cross detection signal VZCD, and compares the zero cross detection signal VZCD with a zero-crossing threshold voltage VZCD_TH, and provides a zero-crossing signal SETO at an output terminal.

The set signal generator 109 provides a set signal SET at an output terminal for controlling the switching frequency of the primary switch 10 based on the second synchronous signal SYNC2 and the zero-crossing signal SETO. In the example shown in FIG. 2, the set signal generator 109 has a first input terminal, a second input terminal and an output terminal, wherein the first input terminal is coupled to the second output terminal of the isolation circuit 103 to receive the second synchronous signal SYNC2, the second input terminal is coupled to the zero cross comparison circuit 108 to receive the zero-crossing signal SETO. The set signal generator 109 provides the set signal SET at the output terminal based on the second synchronous signal SYNC2 and the zero-crossing signal SETO, to control the turning-on of the primary switch 10, and thus controlling the switching frequency of the primary switch 10. In one embodiment, during the start-up period, when the voltage $V_{Pri\_DS}$ across the primary switch 10 firstly reaches its minimum value, i.e., the primary switch 10 is turned on at a first valley. In this way, the working stress of the power devices can be reduced, and the system cost can be saved. In another embodiment, after the start-up period, when the second synchronous signal SYNC2 comes and the voltage $V_{Pri\_DS}$ across the primary switch 10 reaches its minimum value, the primary switch 10 is turned on.

Figure 3:
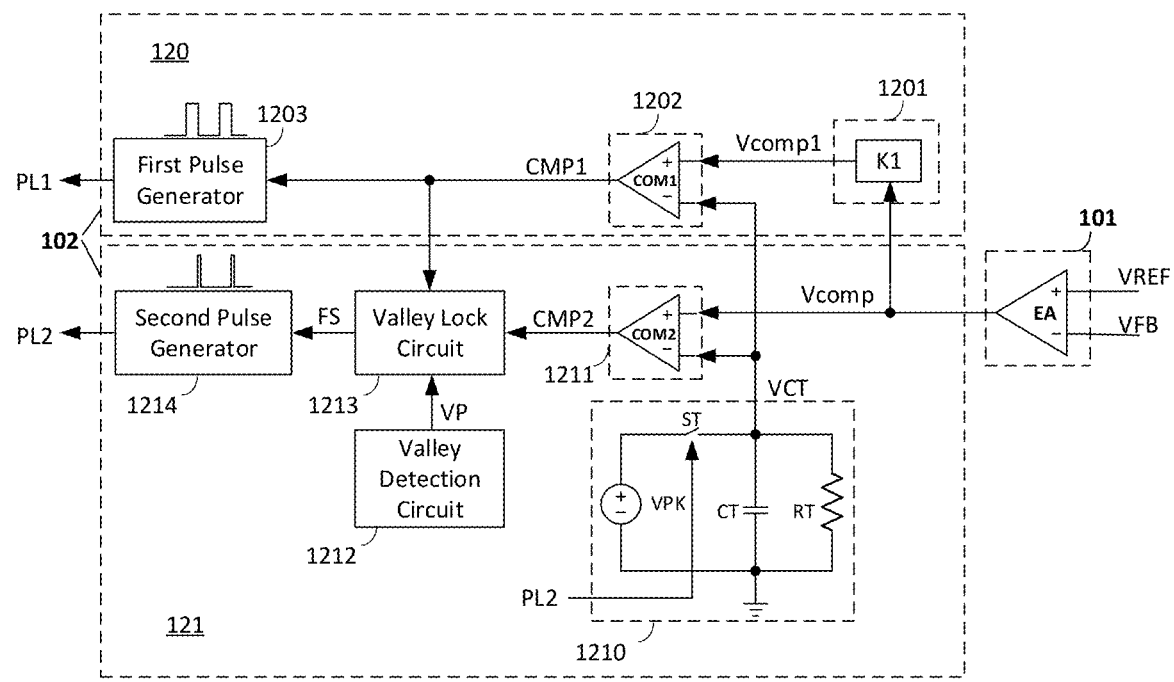
FIG. 3 shows a schematic diagram of an error amplifying circuit 101 and a control generator 102 in accordance with an embodiment of the present invention.

FIG. 3 shows a schematic diagram of an error amplifying circuit 101 and a control generator 102 in accordance with an embodiment of the present invention. In the example shown in FIG. 3, the error amplifying circuit 101 comprises an error amplifier EA. The inverting input terminal of the error amplifier EA is configured to receive the output feedback signal FB indicative of the output voltage Vo of the switching converter, the non-inverting input terminal is configured to receive the reference voltage VREF, the output terminal is configured to provide the first compensation signal Vcomp.

In the example shown in FIG. 3, the control generator 102 comprises a first control signal generator 120 and the second control signal generator 121. As shown in FIG. 3, the first control signal generator 121 comprises a hysteresis compensation circuit 1201, a first comparison circuit 1202 and a first pulse generator 1203. The hysteresis compensation circuit 1201 is coupled to the output terminal of the error amplifying circuit 101 to receive the first compensation signal Vcomp, and provides a second compensation signal Vcomp1 at an output terminal. In one embodiment, the hysteresis compensation circuit 1201 adds a hysteresis signal onto the first compensation signal Vcomp, to generate the second compensation signal Vcomp1. In another embodiment, the second compensation signal Vcomp1 is proportional to the first compensation signal Vcomp, and the proportional coefficient is K1. In one embodiment, K1 is higher than 1.

The first comparison circuit 1202 is coupled to the output terminal of the hysteresis compensation circuit 1201 to receive the second compensation signal Vcomp1, and is also coupled to an output terminal of a modulation generator 1201 to receive a modulation signal VCT. The first comparison circuit 1202 compares the second compensation signal Vcomp1 with the modulation signal VCT, and provides a first comparison signal CMP1 at an output terminal. The first pulse generator 1203 is configured to receive the first comparison signal CMP1, and provides a first control signal PL1 in the form of pulses at an output terminal, for transmitting to the primary side through the first channel of the isolation circuit 103, and to control the current threshold voltage VTH.

In the example shown in FIG. 3, the modulation generator 1210 comprises a voltage source VPK, a switch ST, a capacitor CT and a resistor RT. As shown in FIG. 3, the voltage source VPK has a positive terminal and a negative terminal, wherein the negative terminal is coupled to the secondary reference ground. The switch ST has a first terminal, a second terminal and a control terminal, wherein the first terminal is coupled to the positive terminal of the voltage source VPK, the control terminal is configured to receive the second control signal PL2. The capacitor CT has a first terminal and a second terminal, wherein the first terminal is coupled to the second terminal of the switch ST, the second terminal is coupled to the secondary reference ground. The resistor RT has a first terminal and a second terminal, wherein the first terminal is coupled to the first terminal of the capacitor CT, the second terminal is coupled to the secondary reference ground. The modulation signal VCT is generated at the first terminal of the capacitor CT. When the second control signal PL2 is activated, the modulation signal VCT is pulled up to a peak voltage, then begins to decrease until the second control signal PL2 is activated again.

In the example shown in FIG. 3, the second control signal generator 121 comprises a second comparison circuit 1211, a valley detection circuit 1212, a valley lock circuit 1213 and a second pulse generator 1214. The second comparison circuit 1211 is coupled to the output terminal of the error amplifying circuit 101 to receive the first compensation signal Vcomp, and is further coupled to the modulation generator 1210 to receive the modulation signal VCT. The second comparison circuit 1211 compares the modulation signal VCT with the first compensation signal Vcomp, and provides a second comparison signal CMP2 at an output terminal. The second comparison circuit 1211 comprises a comparator COM2. The non-inverting input terminal of the comparator COM2 is coupled to receive the first compensation signal Vcomp, the inverting input terminal of the comparator COM2 is coupled to the first terminal of the capacitor CT to receive the modulation signal VCT. The comparator COM2 provides the second comparison signal CMP2 at the output terminal.

The valley detection circuit 1212 is configured to detect one or more valleys of a voltage drop across the secondary switch 20 during the OFF state of the secondary switch 20 and generate a valley pulse signal VP at an output terminal. In one embodiment, the valley detection circuit 1212 is configured to detect if the voltage across the secondary switch 20 is less than a valley threshold signal, and provides the valley pulse signal VP based on the detection.

The valley lock circuit 1213 is configured to receive the first comparison signal CMP1, the second comparison signal CMP2, and the valley pulse signal VP. Based on the first comparison signal CMP1, the second comparison signal CMP2, the valley pulse signal VP and a current locked valley number V_LOCK(n−1), the valley lock circuit 1213 determines a target locked valley number V_LOCK(n) for next turning-on, and further provides a frequency control signal FS corresponding to the target valley number V_LOCK(n) at an output terminal, for controlling the switching frequency of the primary switch 10.

In one embodiment, the valley lock circuit 1213 is configured compare a first designated valley number when the modulation signal VCT reaches the second compensation signal Vcomp1 with the current locked valley number V_LOCK(n−1), to determine whether to increase the target locked valley number V_LOCK(n). The valley lock circuit 1213 is configured compare a second designated valley number when the modulation signal VCT reaches the first compensation signal Vcomp with the current locked valley number V_LOCK(n−1), to determine whether to decrease the target locked valley number V_LOCK(n).

The second pulse generator 1214 receives the frequency control signal FS, and provides the second control signal PL2 in the form of pulses at an output terminal, for transmitting to the primary side through the second channel of the isolation circuit 103, to control the switching frequency and valley switching of the primary switch 10.

Figure 4:
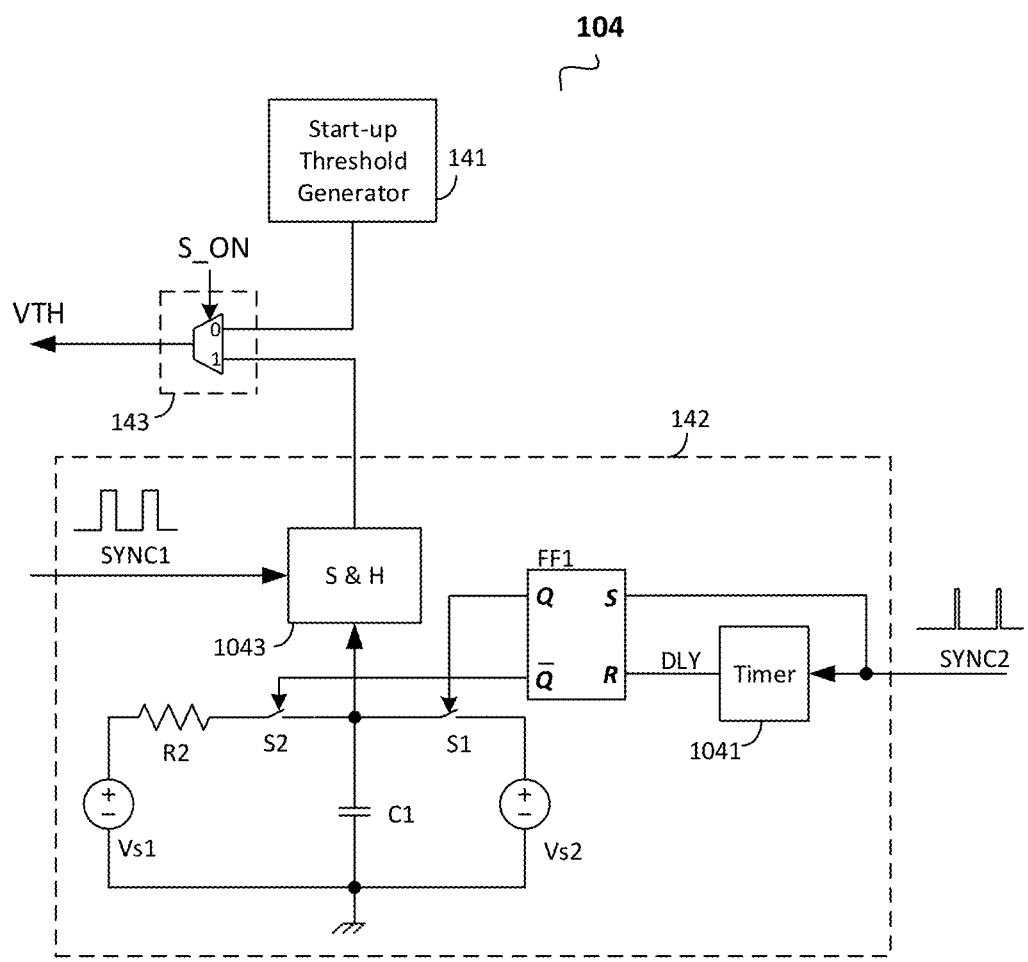
FIG. 4 shows a schematic diagram of a threshold generator 104 in accordance with an embodiment of the present invention.

FIG. 4 shows a schematic diagram of a threshold generator 104 in accordance with an embodiment of the present invention. In the example shown in FIG. 4, the threshold generator 104 comprises a start-up threshold generator 141, a normal threshold generator 142 and a selecting circuit 143. During the start-up period of the isolated switching converter 100, the start-up threshold generator 141 is selected to provide the current threshold voltage VTH which is gradually increasing from a low threshold voltage V1 to a high threshold voltage V2.

Figure 5:
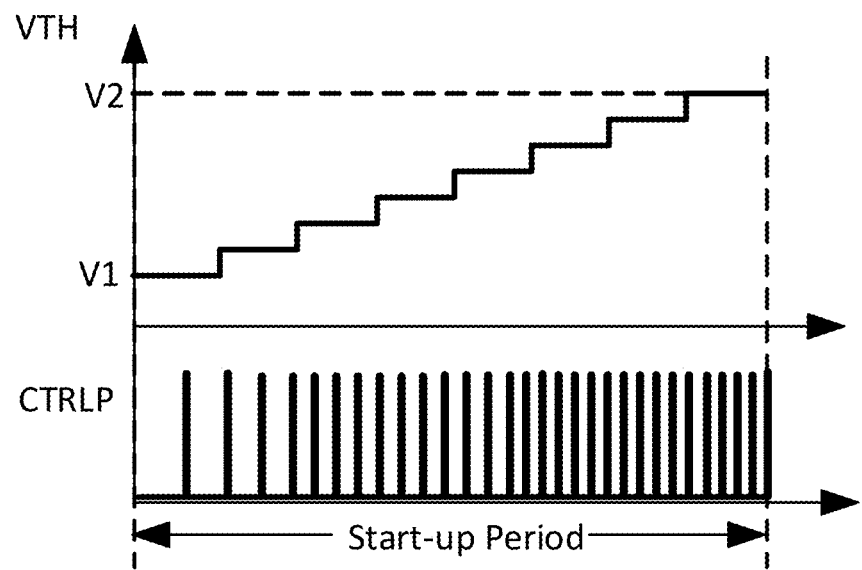
FIG. 5 shows a waveform diagram of a current threshold voltage during a start-up period in accordance with an embodiment of the present invention.

FIG. 5 shows a waveform diagram of a current threshold voltage during a start-up period in accordance with an embodiment of the present invention. As shown in FIG. 5, the current threshold voltage VTH increases from the low threshold voltage V1 to the high threshold voltage V2 over a preset number of times (e.g., 8 times). Furthermore, at the very beginning of the start-up period, the switching frequency of the isolated switching converter is relatively low, and the current threshold voltage VTH is the low threshold voltage V1. Subsequently, the current threshold voltage VTH starts to increase with the switching frequency of the primary switch 10.

Figure 6:
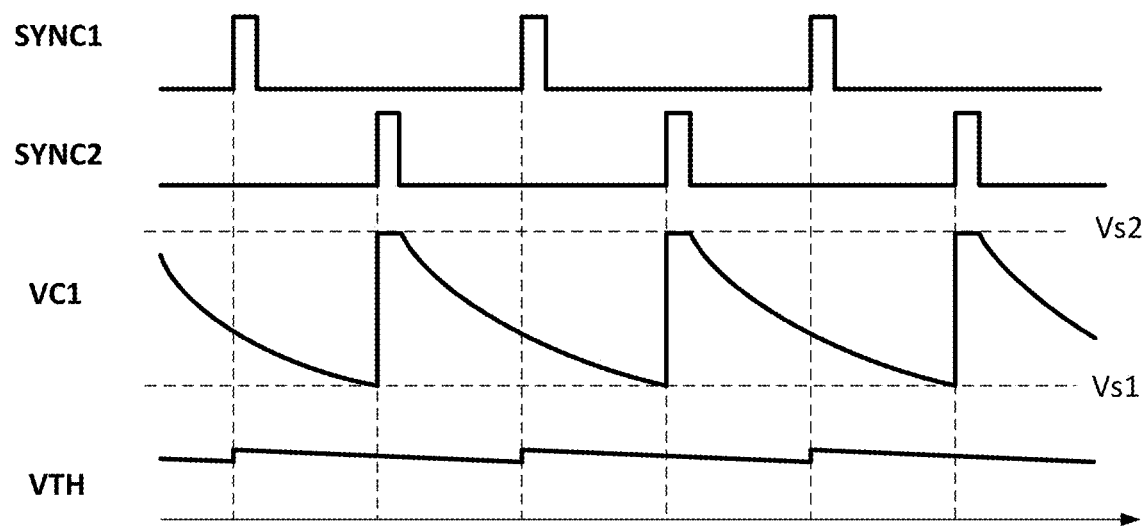
FIG. 6 shows a waveform diagram of a current threshold voltage after the start-up period in accordance with an embodiment of the present invention.

FIG. 6 shows a waveform diagram of a current threshold voltage after the start-up period in accordance with an embodiment of the present invention. The normal threshold generator 142 comprises a first capacitor C1. As shown in FIG. 6, when a rising edge of the second synchronous signal SYNC2 comes, a voltage VC1 across the first capacitor C1 is set to be an upper threshold voltage VS2, and then the voltage across the first capacitor C1 starts to drop with a time constant, and when the first synchronous signal SYNC1 comes, the voltage VC1 across the first capacitor C1 is sampled and held for providing the current threshold voltage VTH.

Referring still to FIG. 4, the normal threshold generator 142 further comprises a timer circuit 1041, a flip-flop FF1, a first voltage source Vs1, a second voltage source Vs2, a first switch S1, a second switch S2, a resistor R2 and a sample-and-hold circuit 1043. In the example shown in FIG. 4, the timer circuit 1041 has an input terminal and an output terminal, wherein the input terminal is coupled to the second output terminal of the isolation circuit 103 to receive the second synchronous signal SYNC2. Based the second synchronous signal SYNC2, the timer circuit 1041 provides a timing signal DLY at the output terminal. The flip-flop FF1 has a set terminal, a reset terminal, an output terminal and an inverting output terminal, wherein the reset terminal is coupled to the second synchronous signal SYNC2, the reset terminal is coupled to the output terminal of the timer circuit 1041 for receiving the timing signal DLY. The first voltage source Vs1 has a positive terminal, and a negative terminal coupled to the primary reference ground. The second voltage source Vs2 has a positive terminal, and a negative terminal coupled to the primary reference ground. The first switch S1 has a first terminal, a second terminal and a control terminal, wherein the first terminal is coupled to the first terminal of the first capacitor C1, and the second terminal is coupled to the positive terminal of the first voltage source Vs1, and the control terminal is coupled to the output terminal of the flip-flop FF1. The second switch S2 has a first terminal, a second terminal and a control terminal, wherein the first terminal is coupled to the first terminal of the first capacitor C1, the second terminal is coupled to the positive terminal of the second voltage source Vs2 through the resistor R2, and the control terminal is coupled to the inverting output terminal of the flip-flop FF1. The sample-and-hold circuit 1042 has a first input terminal, a second input terminal and an output terminal, wherein the first input terminal is coupled to the first output terminal of the isolation circuit 103 to receive the first synchronous signal SYNC1, the second input terminal is coupled to the first terminal of the first capacitor C1 to receive the voltage VC1 across the first capacitor C1. The sample-and-hold circuit 1042 is configured to provide the current threshold voltage VTH at the output terminal by sampling and holding the voltage VC1 across the first capacitor C1 based on the first synchronous signal SYNC1.

The selecting circuit 143 has a first input terminal, a second input terminal, and a control terminal, wherein the first input terminal is coupled to the output terminal of the start-up threshold generator 141, the second input terminal is coupled to the output terminal of the normal threshold generator 142. Based on the activation signal S_ON, the selecting circuit 143 provides the proper current threshold voltage VTH.

Figure 7:
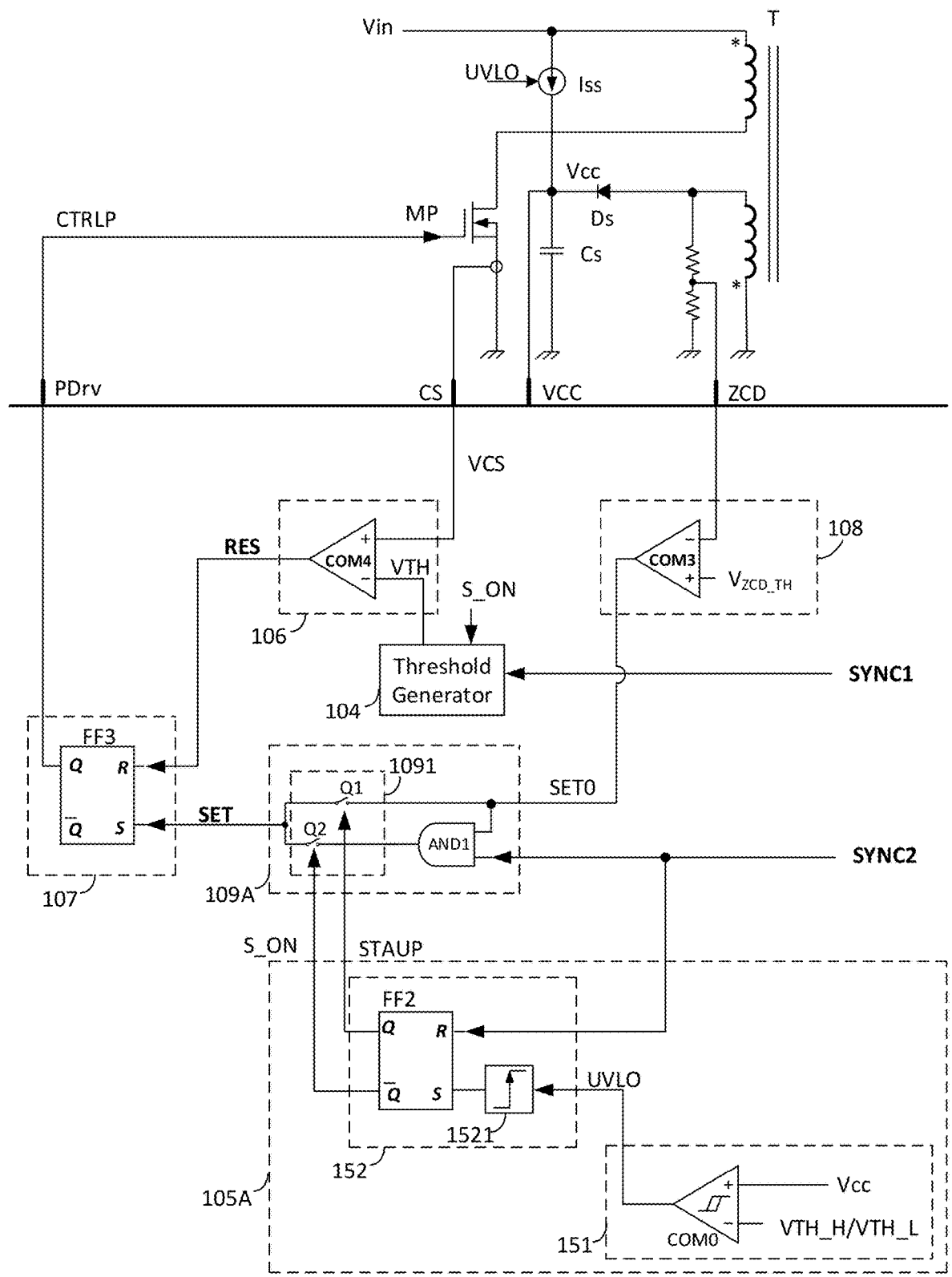
FIG. 7 shows a schematic diagram of a primary-side controller in accordance with an embodiment of the present invention.

FIG. 7 shows a schematic diagram of a primary-side controller in accordance with an embodiment of the present invention. In the example shown in FIG. 7, compared with the isolated switching converter 100A, the transformer T has an auxiliary winding having a first terminal and a second terminal, wherein the second terminal of the auxiliary winding is coupled to the primary reference ground. The switching converter further comprises a supply diode Ds, a supply capacitor Cs, and a supply current source Iss. The supply capacitor Cs has a first terminal and a second terminal, wherein the first terminal provides a primary supply voltage Vcc for the primary-side control circuit, and the second terminal is coupled to the primary reference ground. The supply diode Ds has an anode and a cathode, wherein the anode is coupled to the first terminal of the auxiliary winding, and the cathode is coupled to the first terminal of the supply capacitor Cs.

In the example shown in FIG. 7, the start-up control unit 105 comprises an under voltage lockout circuit 151 and a start-up circuit 152. The under voltage lockout circuit 151 is coupled to the first terminal of the supply capacitor Cs to receive the primary supply voltage Vcc, and compares the primary supply voltage Vcc with a first supply threshold voltage VTH_H and a second supply threshold voltage VTH_L to generate an under voltage lockout signal UVLO. The supply current source Iss has an input terminal, an output terminal and a control terminal, wherein the input terminal is coupled to the first terminal of the primary winding to receive the input voltage Vin, or coupled to a high voltage input power supply terminal (such as HV), the output terminal is coupled to the first terminal of the supply capacitor Cs, and the control terminal is coupled to the under voltage lockout circuit 151 to receive the under voltage lockout signal UVLO. When the primary supply voltage Vcc is higher than the first supply threshold voltage VTH_H, the supply current source Iss is turned off. When the primary supply voltage Vcc is lower than the second supply threshold voltage VTH_L, the supply current source Iss is turned on to charge the supply capacitor Cs. In some embodiments, when the supply voltage Vcc is lower than the second supply threshold voltage VTH_L, most of the primary-side controller powered by the primary supply voltage Vcc stop working to avoid malfunction.

The start-up circuit 152 has a first input terminal, a second input terminal and an output terminal, wherein the first input terminal is coupled to the under voltage lockout circuit 151 to receive the under voltage lockout signal UVLO, and the second input terminal is coupled to the second output terminal of the isolation circuit 103 to receive the second synchronous signal SYNC2. Based on the under voltage lockout signal UVLO and the second synchronous signal SYNC2, the start-up circuit 152 generates a start-up signal STAUP indicating the start of the start-up period and an activation signal S_ON indicating the end of the start-up period at the output terminal.

In the example shown in FIG. 7, the under voltage lockout circuit 151 comprises a hysteretic comparator COMO. The start-up circuit 152 comprises a one-shot circuit 1521 and a flip-flop FF2. The one-shot circuit 1521 has an input terminal and an output terminal, wherein the input terminal is coupled to the under voltage lockout circuit 151 to receive the under voltage lockout signal UVLO. The flip-flop FF2 has a set terminal, a reset terminal and an output terminal, wherein the set terminal is coupled to the output terminal of the one-shot circuit 1521, the reset terminal is coupled to the second output terminal of the isolation circuit 103 to receive the second synchronous signal SYNC2, and the output terminal provides the start-up signal STAUP, the inverting output terminal provides the activation signal S_ON. Wherein the reset of the flip-flop FF2 takes precedence.

The zero-cross comparison circuit 108 comprises a comparator COM3. The non-inverting input terminal of the comparator COM3 receives a zero-crossing threshold voltage VZCD_TH, the inverting input terminal is coupled to the zero-crossing detection pin ZCD to receive a zero-crossing detection signal VZCD, and the output terminal provides the zero-crossing signal SETO.

The set signal generator 109A comprise an AND gate circuit AND1 and a selection circuit 1091. The AND gate circuit AND1 has a first input terminal, a second input terminal and an output terminal, wherein the first input terminal receives the second synchronous signal SYNC2, and the second input terminal is coupled to the output terminal of the zero-cross comparison circuit 108 to receive the zero-cross signal SETO. The selection circuit 1091 is coupled to the start-up control unit 105 and receives the start-up signal STAUP and the activation signal S_ON. When the start-up signal STAUP is activated, the selection circuit 1091 selects the zero-crossing signal SETO as the set signal SET for providing to the primary logic circuit 107. When the activation signal S_ON becomes high, the selection circuit 1091 selects the output of the AND gate circuit AND1 as the set signal SET for providing to the primary logic circuit 107. In the example shown in FIG. 7, the selection circuit 1091 comprises switches Q1 and Q2.

The reset signal generator 106 comprises a comparator COM4. The non-inverting input terminal of the comparator COM4 is coupled to the current sense pin CS to receive the current sense signal VCS, and the inverting input terminal of the comparator COM4 is coupled to the output terminal of the threshold generator 104 to receive the current threshold voltage VTH. According to an embodiment of the present invention, during the start-up period, that is, when the start-up signal STAUP is activated, the start-up threshold generator 141 provides a gradually increasing current threshold voltage VTH. When the activation signal S_ON is activated, the start-up period ends, and the current threshold voltage VTH is generated by the normal threshold generator 142 based on the first synchronous signal SYNC1.

The primary logic circuit 107 comprises a flip-flop FF3. The flip-flop FF3 has a set terminal, a reset terminal and an output terminal, wherein the set terminal is coupled to the output terminal of the set signal generator 109A to receive the set signal SET, and the reset terminal is coupled to the output terminal of the reset signal generator 106 to receive the reset signal RST, a primary control signal CTRLP is provided at the output terminal to control the primary switch 10.

Figure 8:
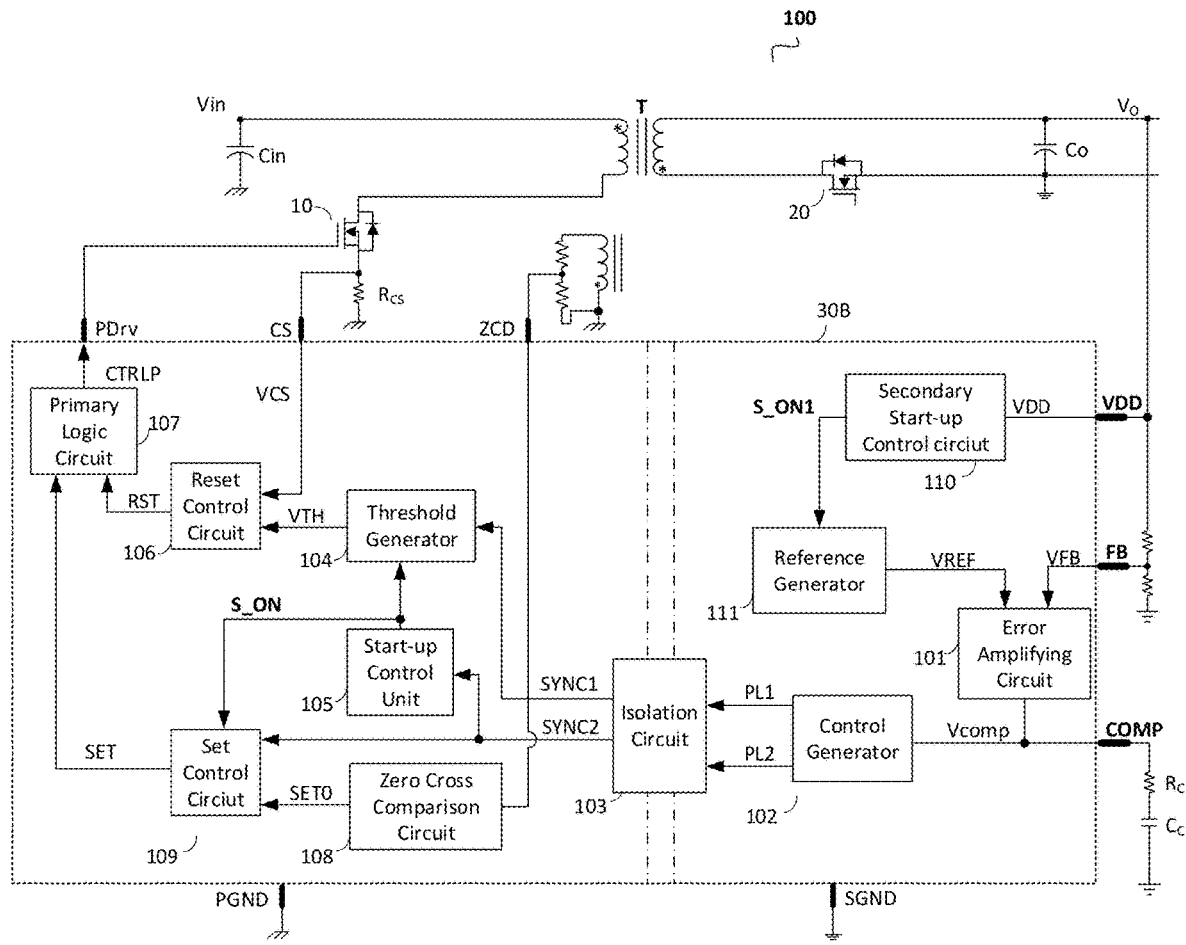
FIG. 8 shows a block diagram of an isolated switching converter 100B in accordance with an embodiment of the present invention.

FIG. 8 shows a block diagram of an isolated switching converter 100B in accordance with an embodiment of the present invention. Compared with the controller 30A shown in FIG. 2, the controller 30B further comprises a secondary start-up control circuit 110 and a reference voltage generator 111.

In the example shown in FIG. 8, the controller 30B further comprises a secondary supply pin VD coupled to the output voltage Vo and configured to supply the control circuits on the secondary side of the controller 30B.

The secondary start-up control circuit 110 is coupled to the secondary supply pin VD to receive a secondary supply voltage VDD, and compares the secondary supply voltage VDD with a third threshold voltage VDD_ON. Based the comparison, the secondary start-up control circuit 110 provides a second activation signal S_ON1, which indicates if the secondary side is activated. The reference voltage generator 111 is coupled to the secondary start-up control circuit 110 to receive the second activation signal S_ON1, and adjusts the reference voltage VREF based on the second activation signal S_ON1. In detail, during the start-up period, the reference voltage VREF gradually increases with the output feedback signal VFB. While when the secondary side is activated, the reference voltage VREF remains unchanged at a first reference voltage VREF1 since the end of the start-up period.

Figure 9:
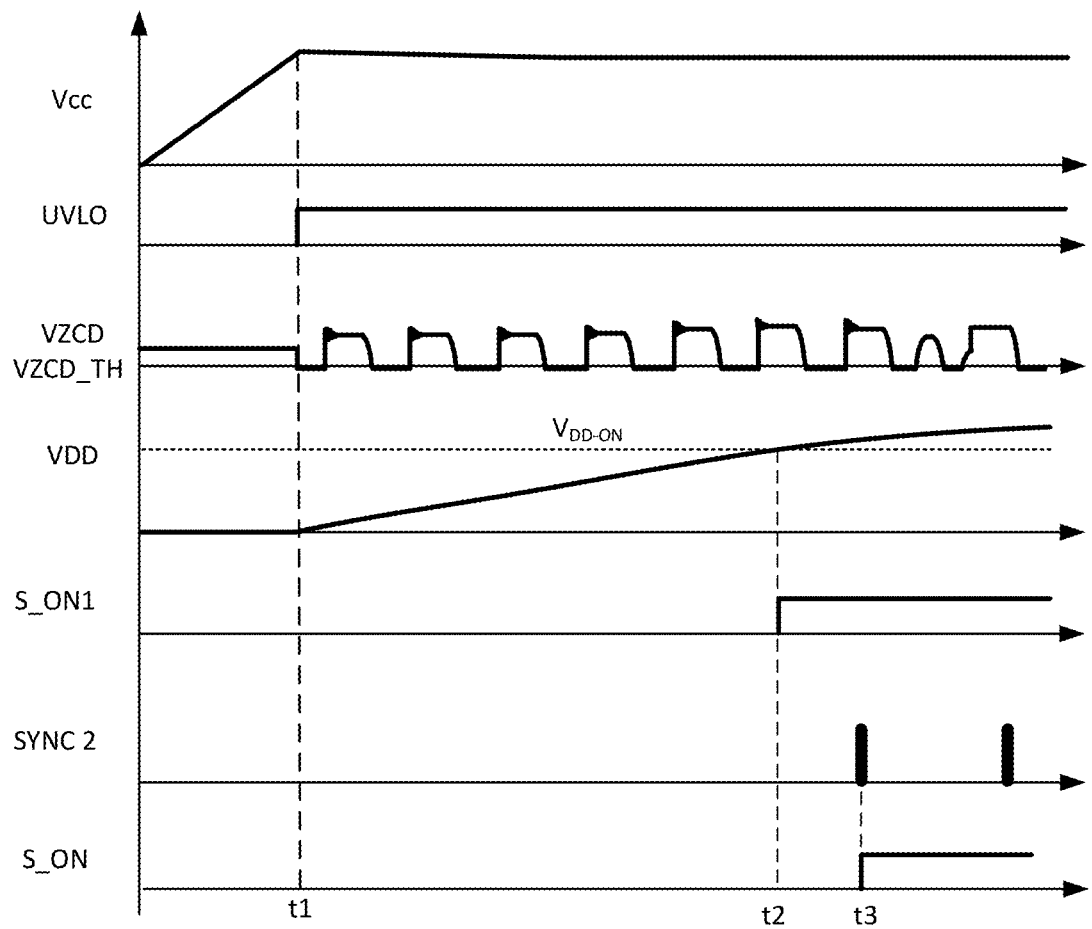
FIG. 9 shows a working waveform diagram of the isolated switching converter 200B during a start-up period in accordance with an embodiment of the present invention.

FIG. 9 shows a working waveform diagram of the isolated switching converter 200B during a start-up period in accordance with an embodiment of the present invention. As shown in FIG. 9, at time t1, the primary supply voltage Vcc increases to be greater than the first threshold voltage VTH_H, and the under voltage lockout signal UVLO is set to be high. Afterwards, the switching converter starts to star-up, the primary switch 10 starts to work to provide energy for the secondary side, the output voltage Vo starts to increase, and the secondary supply voltage VDD also increases accordingly.

During the start-up period, the current threshold voltage VTH gradually increases, and the ON time of the primary switch 10 also gradually increases. The turning-on of the primary switch 10 is determined by the zero-crossing signal SETO generated by the zero-crossing detection signal VZCD and the zero-crossing threshold voltage VZCD_TH.

At time t2, the secondary supply voltage VDD increases to be greater than the third threshold voltage VDD_ON, the second activation signal S_ON1 is activated. At time t3, when a first pulse of the second synchronous signal SYNC2 comes, the activation signal S_ON is set to be high, and the primary side will detect the end of the start-up period. Then the second synchronous signal SYNC2 together with the zero-crossing detection signal VZCD determines the turning-on of the primary switch 10.

Figure 10:
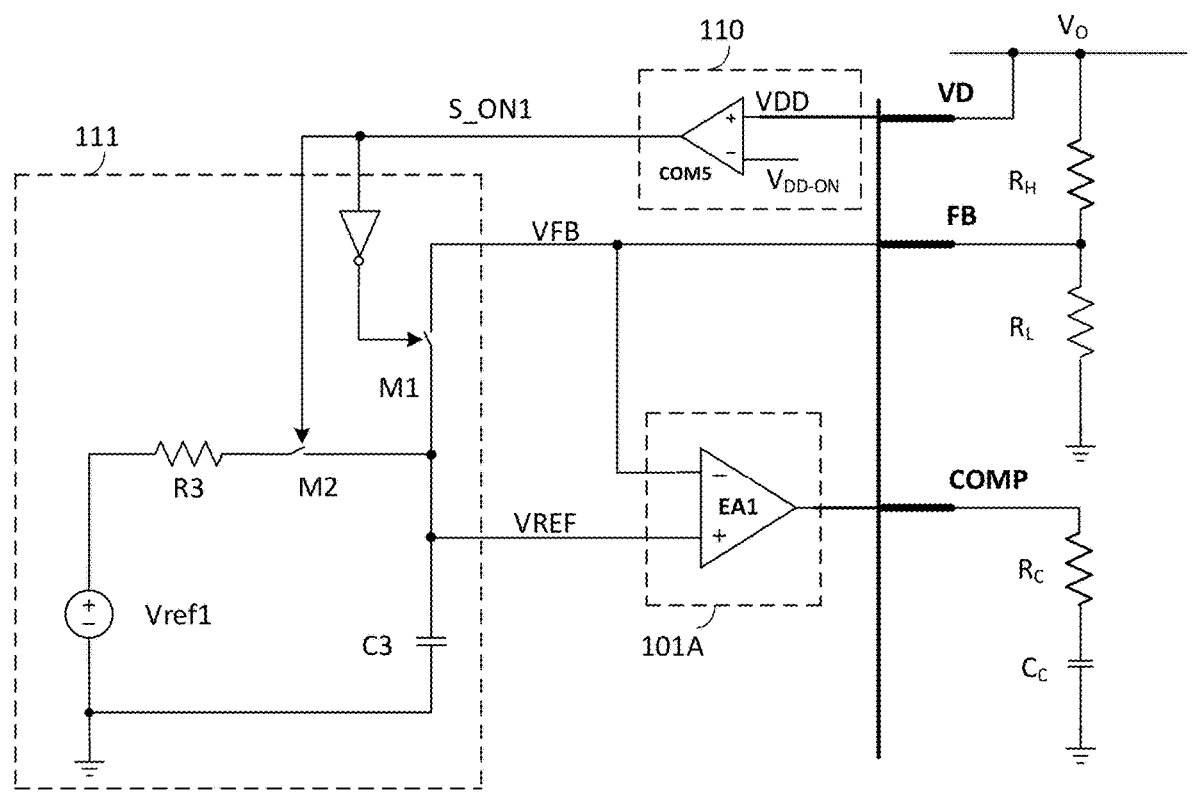
FIG. 10 partially shows a schematic diagram of a secondary-side controller in accordance with an embodiment of the present invention.

FIG. 10 partially shows a schematic diagram of the secondary-side controller in accordance with an embodiment of the present invention. In the example shown in FIG. 10, the secondary start-up control circuit 110 comprises a comparator COM5. The non-inverting input terminal of the comparator COM5 is coupled to the secondary supply pin VD to receive the secondary supply voltage VDD, and the non-inverting input terminal receives the third threshold voltage VDD_ON, the comparator COM5 provides the second activation signal S_ON1 at the output terminal.

The reference voltage generator 111 comprises a reference capacitor C3, a reference voltage source Vref1, a reference resistor R3, and switches M1 and M2. The reference capacitor C3 has a first terminal and a second terminal, wherein the first terminal is coupled to the second input terminal of the error amplifying circuit 101A, and the second terminal is coupled to the secondary reference ground. The reference voltage source Vref1 has a positive terminal and a negative terminal, wherein the negative terminal is coupled to the secondary reference ground. The switches M1 and M2 constitute a selection switch circuit, are coupled to the secondary start-up control circuit 110 to receive the second activation signal S_ON1. Based on the second activation signal S_ON1, the selection switch circuit is configured to selectively couple the first terminal of the reference capacitor C3 to the first input terminal of the error amplifying circuit 101A, or to the positive terminal of the reference voltage source Vref1 via the reference resistor R3. In one embodiment, when the second activation signal S_ON1 is at a low level, the reference voltage VREF increases gradually with the output feedback signal VFB during the start-up period. When the second activation signal S_ON1 is at a high level, the reference voltage VREF is disconnected from the output feedback pin FB, and gradually increases to the first reference voltage VREF1 with a preset time constant.

Figure 11:
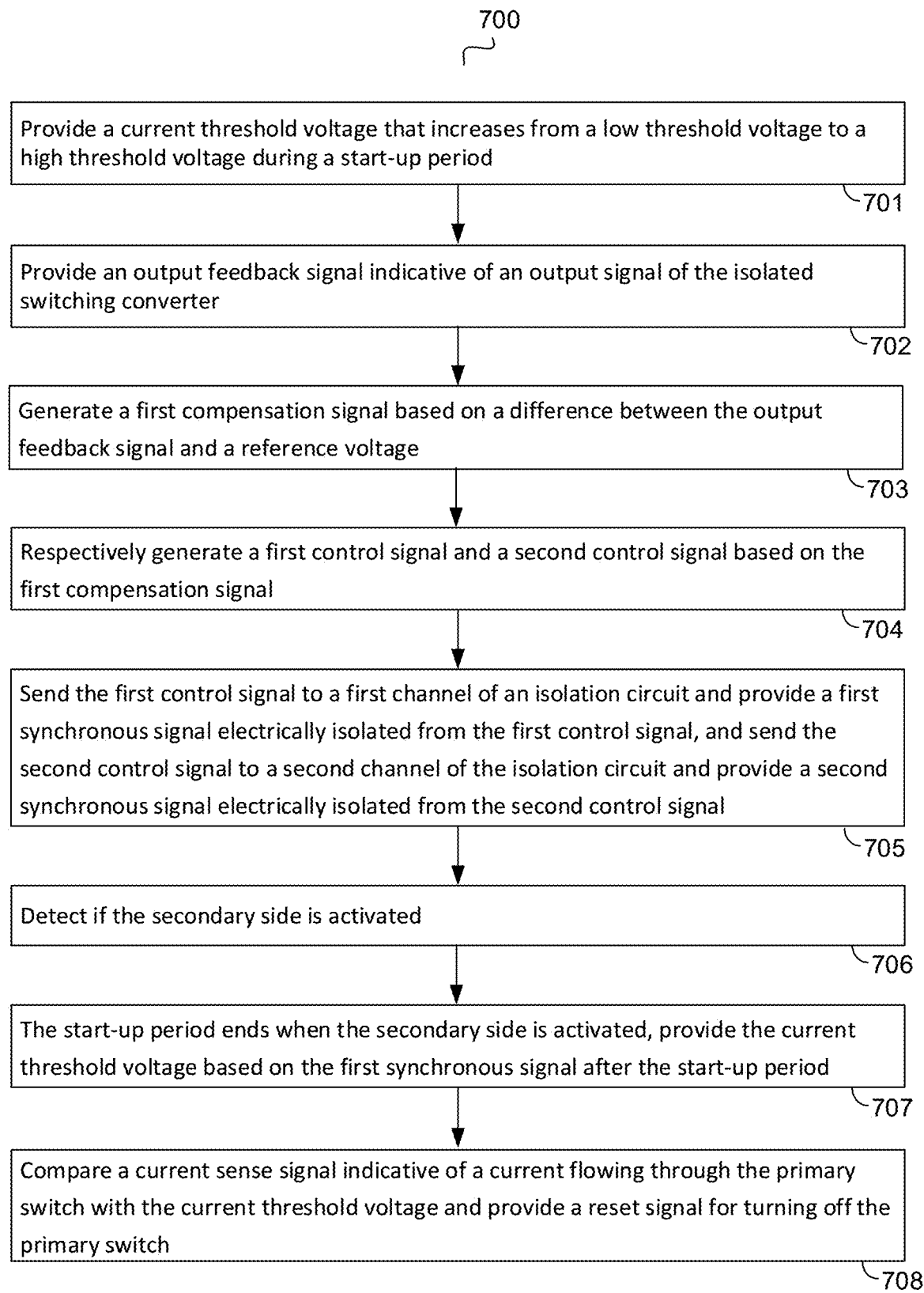
FIG. 11 shows a flow diagram of a control method 700 for an isolated switching converter in accordance with an embodiment of the present invention.

FIG. 11 shows a flow diagram of a control method 700 for an isolated switching converter in accordance with an embodiment of the present invention. The isolated switching converter has a primary switch and an isolation circuit with two isolated channels, the control method comprises steps 701-708.

At step 701, during a start-up period, a gradually increasing current threshold voltage is provided. In one embodiment, the current threshold voltage gradually increases from a low threshold voltage to a high threshold voltage for a predetermined number of times during the start-up period.

At step 702, an output feedback signal is generated based on an output signal of the isolated switching converter.

At step 703, a first compensation signal is generated based on the difference between the output feedback signal and a reference voltage.

In step 704, a first control signal and a second control signal are respectively generated based on the first compensation signal. In one embodiment, the method for generating a first control signal comprises: generating a second compensation signal based on the first compensation signal; comparing the second compensation signal with a modulation signal to provide a first comparison signal; and based on the first comparison signal, providing a first control signal.

In a further embodiment, the method for generating the second control signal comprises: comparing the first compensation signal with the modulating signal to generate a second comparison signal; determining a target locked valley number based on the first comparison signal, the second comparison signal, a valley pulse signal indicative of one or more valleys of a voltage drop across a secondary switch during the OFF state of the secondary switch, and providing a second control signal corresponding to the target locked valley number.

At step 705, the first and second control signals are respectively sent to a first and second channels of the isolation circuit to generate a first synchronous signal electrically isolated from the first control signal, and a second synchronous signal electrically isolated from the second control signal.

At step 706, it is detected whether the secondary side is activated. In one embodiment, when a first pulse signal of the second synchronous signal is transmitted to the primary side through the isolation circuit, the secondary side is activated. In another embodiment, the secondary side is activated when a secondary supply voltage increases to a third threshold voltage.

At step 707, the start-up period ends when the secondary side is activated, the current threshold voltage is provided based on the first synchronous signal. In one embodiment, when the rising edge of the second synchronous signal comes, the voltage across a first capacitor is set high to an upper threshold voltage. Afterwards, the voltage across the first capacitor begins to drop. And when the first synchronous signal comes, the voltage across the first capacitor is sampled and held to provide the current threshold voltage after the start-up period.

At step 708, a current sense signal representing a current flowing through the primary switch is compared with the current threshold voltage to generate a reset signal for turning off the primary switch.

In one embodiment, the control method 700 further comprises: providing a zero-crossing signal by detecting if the voltage across the primary switch reaches a valley; providing a set signal for turning-on the primary switch based on the zero-crossing signal during the start-up period; or providing the set signal based on the second synchronous signal and the zero-crossing signal after the start-up period. In another embodiment, after the start-up period ends, when the second synchronous signal comes and the voltage across the primary switch reaches its minimum value, the primary switch is turned on.

In another embodiment, the control method 700 further comprises: the reference voltage gradually increases with the output feedback signal during the start-up period. And when the secondary side is activated, the start-up period ends, and the reference voltage is increased to a first reference voltage and then keeps unchanged.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in an isolated switching converter having a primary switch, the controller comprising:
    an error amplifying circuit having a first input terminal, a second input terminal and an output terminal, wherein the first input terminal is configured to receive an output feedback signal indicative of an output signal of the isolated switching converter, the second input terminal is configured to receive a reference voltage, the error amplifying circuit provides a first compensation signal at the output terminal based on the difference between the output feedback signal and the reference voltage;
    a control generator configured to respectively generate a first control signal and a second control signal based on the first compensation signal;
    an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal;

a reset signal generator configured to generate a reset signal by comparing a current sense signal indicative of a current flowing through the primary switch with a current threshold voltage; and a threshold generator configured to provide the current threshold voltage, comprising:

a start-up threshold generator configured to provide the current threshold voltage which is gradually increasing during a start-up period; and a normal threshold generator configured to provide the current threshold voltage based on the first synchronous signal after the start-up period.

2. The controller of claim 1, further comprising:
a start-up control unit configured to provide to an activation signal indicating if the secondary side is activated based on the second synchronous signal.

3. The controller of claim 2, wherein the start-up control unit comprising:

an under voltage lockout circuit coupled to a supply capacitor to receive a primary supply voltage and configured to provide an under voltage lockout signal by comparing the primary supply voltage with a first supply threshold voltage and a second supply threshold voltage; and a start-up circuit having a first input terminal, a second input terminal, an output terminal and an inverting output terminal, wherein the first input terminal is coupled to the under voltage lockout circuit to receive the under voltage lockout signal, the second input terminal is configured to receive the second synchronous signal, the start-up circuit provides a start-up signal at the output terminal and provides the activation signal at the inverting output terminal.

4. The controller of claim 1, further comprising:
a zero cross comparison circuit configured to provide a zero-crossing signal by detecting if a voltage across the primary switch reaches a valley;

a set signal generator configured to generate a set signal, wherein the set signal is generated based on the zero-crossing signal during the start-up period, and the set signal is generated based on the second synchronous signal and the zero-crossing signal after the start-up period; and a primary logic circuit configured to provide a primary control signal for controlling the primary switch based on the set signal and the reset signal.

5. The controller of claim 1, wherein during the start-up period, the current threshold voltage gradually increases from a low threshold voltage to a high threshold voltage over a preset number of times.

6. The controller of claim 1, wherein the normal threshold generator comprising:

a timer circuit configured to provide a timing signal at an output terminal based on the second synchronous signal;

a flip-flop having a first input terminal, a second input terminal, an output terminal and an inverting output terminal, wherein the first input terminal is configured to receive the second synchronous signal, the second input terminal is coupled to the output terminal of the timer circuit to receive the timing signal;

a first capacitor having a first terminal, and a second terminal coupled to a primary reference ground;

a first voltage source having a positive terminal, and a negative terminal coupled to the primary reference ground;

a second voltage source having a positive terminal, and a negative terminal coupled to the primary reference ground;

a first switch having a first terminal, a second terminal and a control terminal, wherein the first terminal is coupled to the first terminal of the first capacitor, and the second terminal is coupled to the positive terminal of the first voltage source, and the control terminal is coupled to the output terminal of the flip-flop;

a second switch having a first terminal, a second terminal and a control terminal, wherein the first terminal is coupled to the first terminal of the first capacitor, the second terminal is coupled to the positive terminal of the second voltage source through a first resistor, and the control terminal is coupled to the inverting output terminal of the flip-flop; and a sample-and-hold circuit configured to provide the current threshold voltage by sampling and holding the voltage across the first capacitor based on the first synchronous signal.

7. The controller of claim 1, wherein the reference voltage gradually increases with the output feedback signal during the start-up period and increases to a first reference voltage at the end of the start-up period.

8. The controller of claim 7, further comprising:
a secondary start-up control circuit configured to compare a secondary supply voltage with a third threshold voltage for providing a second activation signal.

9. The controller of claim 8, further comprising a reference voltage generator, comprising:

a reference capacitor having a first terminal and a second terminal, wherein the first terminal is coupled to the second input terminal of the error amplifying circuit, and the second terminal is coupled to the secondary reference ground;

a reference voltage source having a positive terminal and a negative terminal coupled to the secondary reference ground; and a selecting switch circuit configured to selectively couple the first terminal of the reference capacitor to the first input terminal of the error amplifying circuit or to the positive terminal of the reference voltage source through a reference resistor based on the second activation signal.

10. An isolated switching converter, comprising:
a primary switch coupled to a primary winding of a transformer; and a controller, comprising:

an error amplifying circuit having a first input terminal, a second input terminal and an output terminal, wherein the first input terminal is configured to receive an output feedback signal indicative of an output signal of the isolated switching converter, the second input terminal is configured to receive a reference voltage, the error amplifying circuit provides a first compensation signal at the output terminal based on the difference between the output feedback signal and the reference voltage;

a control generator configured to respectively generate a first control signal and a second control signal based on the first compensation signal;

an isolation circuit having a first channel to transmit the first control signal and a second channel to transmit the second control signal, and having a first output terminal for providing a first synchronous signal electrically isolated from the first control signal and a second output terminal for providing a second synchronous signal electrically isolated from the second control signal; and a threshold generator configured to provide a current threshold voltage for control a maximum value of a current flowing through the primary switch, comprising:
  a start-up threshold generator configured to provide the current threshold voltage which is gradually increasing during a start-up period; and
  a normal threshold generator configured to provide the current threshold voltage based on the first synchronous signal after the start-up period.

11. The isolated switching converter of claim 10, further comprising:
a start-up control unit configured to provide to an activation signal indicating if the secondary side is activated based on the second synchronous signal.

12. The isolated switching converter of claim 11, wherein the start-up control unit comprising:
an under voltage lockout circuit coupled to a supply capacitor to receive a primary supply voltage and configured to provide an under voltage lockout signal by comparing the primary supply voltage with a first supply threshold voltage and a second supply threshold voltage; and
a start-up circuit having a first input terminal, a second input terminal, an output terminal and an inverting output terminal, wherein the first input terminal is coupled to the under voltage lockout circuit to receive the under voltage lockout signal, the second input terminal is configured to receive the second synchronous signal, the start-up circuit provides a start-up signal at the output terminal and provides the activation signal at the inverting output terminal.

13. The isolated switching converter of claim 10, wherein the normal threshold generator comprising:
a timer circuit configured to provide a timing signal at an output terminal based on the second synchronous signal;
a flip-flop having a first input terminal, a second input terminal, an output terminal and an inverting output terminal, wherein the first input terminal is configured to receive the second synchronous signal, the second input terminal is coupled to the output terminal of the timer circuit to receive the timing signal;
a first capacitor having a first terminal, and a second terminal coupled to a primary reference ground;
a first voltage source having a positive terminal, and a negative terminal coupled to the primary reference ground;
a second voltage source having a positive terminal, and a negative terminal coupled to the primary reference ground;
a first switch having a first terminal, a second terminal and a control terminal, wherein the first terminal is coupled to the first terminal of the first capacitor, and the second terminal is coupled to the positive terminal of the first voltage source, and the control terminal is coupled to the output terminal of the flip-flop;
a second switch having a first terminal, a second terminal and a control terminal, wherein the first terminal is coupled to the first terminal of the first capacitor, the second terminal is coupled to the positive terminal of the second voltage source through a first resistor, and the control terminal is coupled to the inverting output terminal of the flip-flop; and a sample-and-hold circuit configured to provide the current threshold voltage by sampling and holding the voltage across the first capacitor based on the first synchronous signal.

14. The isolated switching converter of claim 10, wherein the reference voltage gradually increases with the output feedback signal during the start-up period and increases to a first reference voltage at the end of the start-up period.

15. The isolated switching converter of claim 14, further comprises:
a secondary start-up control circuit configured to compare a secondary supply voltage with a third threshold voltage for providing a second activation signal.

16. A control method used in an isolated switching converter, wherein the isolated switching converter has a primary switch and an isolation circuit, the control method comprising:
providing a current threshold voltage which is gradually increasing during a start-up period;
providing an output feedback signal indicative of an output signal of the isolated switching converter;
providing a first compensation signal based on the difference between the output feedback signal and a reference voltage;
generating a first control signal and a second control signal based on the first compensation signal;
transmitting the first control signal to a first channel of the isolation circuit and providing a first synchronous signal electrically isolated from the first control signal;
transmitting the second control signal to a second channel of the isolation circuit and providing a second synchronous signal electrically isolated from the second control signal;
detecting if a secondary side is activated;
the start-up period ends when the secondary side is activated, providing the current threshold voltage based on the first synchronous signal after the start-up period; and
comparing a current sense signal indicative of the current flowing through the primary switch with the current threshold voltage and generating a reset signal for turning-off the primary switch.

17. The control method of claim 16, wherein providing the current threshold voltage based on the first synchronous signal comprising:
charging a voltage across a first capacitor to an upper threshold voltage based on the second synchronous signal;
discharging the first capacitor; and
sampling and holding the voltage across the first capacitor as the current threshold voltage when the first synchronous signal comes.

18. The control method of claim 16, wherein the secondary side is activated when a first pulse of the second synchronous signal is transmitted to the primary side through the isolation circuit.

19. The control method of claim 16, wherein the reference voltage gradually increases with the output feedback signal during the start-up period and increases to a first reference voltage at the end of the start-up period.

20. The control method of claim 16, wherein the secondary side is activated when a secondary supply voltage increases to a third threshold voltage.

* * * * *